United States Patent
Glöge

(10) Patent No.: US 10,259,744 B2
(45) Date of Patent: Apr. 16, 2019

(54) PROCESS FOR PRODUCING AN OPTICAL GLASS WITH AN ANTI-FOG COATING

(71) Applicant: Carl Zeiss Vision International GmbH, Aalen (DE)

(72) Inventor: Thomas Glöge, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 156 days.

(21) Appl. No.: 15/640,711

(22) Filed: Jul. 3, 2017

(65) Prior Publication Data

US 2017/0297955 A1 Oct. 19, 2017

Related U.S. Application Data

(63) Continuation of application No. PCT/EP2016/061892, filed on May 26, 2016.

(30) Foreign Application Priority Data

May 28, 2015 (DE) .................. 10 2015 209 794

(51) Int. Cl.
*C03C 17/42* (2006.01)
*C03C 17/34* (2006.01)
*C09D 183/08* (2006.01)
*C09D 183/12* (2006.01)
*C03C 17/30* (2006.01)

(52) U.S. Cl.
CPC ............. *C03C 17/42* (2013.01); *C03C 17/30* (2013.01); *C03C 17/3405* (2013.01); *C09D 183/08* (2013.01); *C09D 183/12* (2013.01); *C03C 2217/732* (2013.01); *C03C 2217/75* (2013.01); *C03C 2218/111* (2013.01); *C03C 2218/324* (2013.01)

(58) Field of Classification Search
None
See application file for complete search history.

(56) References Cited

U.S. PATENT DOCUMENTS

| 5,017,540 A * | 5/1991 | Sandoval | ............... B01D 57/02 204/454 |
| 5,326,738 A * | 7/1994 | Sandoval | ............... B01D 57/02 502/158 |
| 6,677,163 B1 * | 1/2004 | Boukherroub | ......... C07H 15/26 435/181 |
| 9,500,860 B2 | 11/2016 | Gloege et al. | |
| 2002/0160139 A1 * | 10/2002 | Huang | ................... B01J 20/285 428/36.9 |
| 2013/0274381 A1 | 10/2013 | Hugenberg et al. | |
| 2015/0298165 A1 * | 10/2015 | Smith | ..................... B05D 1/60 428/34.1 |

FOREIGN PATENT DOCUMENTS

| DE | 10 2012 009 691 A1 | 11/2013 |
| EP | 1 473 344 A1 | 11/2004 |
| EP | 2 578 649 A1 | 4/2013 |
| EP | 2 664 659 A1 | 11/2013 |

OTHER PUBLICATIONS

Langner et al., "Controlled Silicon Surface Functionalization by Alkene Hydrosilylation" J. Am. Chem. Soc. 2005, 127, 12798-12799. (Year: 2005).*
Dahmen et al., "Surface Functionalzation of amorphous silicone and silicon suboxides for biological applications" Thin Solid Films 2003, 427, 201-207. (Year: 2003).*
Onclin et al., "Engineering Silicon Oxide Surfaces Using Self-Assembled Monolayers" Angew. Chem. Int. Ed. 2005, 44, 6282-6304. (Year: 2005).*
Pesek et al."Methods for the Modification and Characterization of Oxide Surfaces" Interface Science 1997, 5, 103-117. (Year: 1997).*
International Search Report of the European Patent Office in PCT/EP2016/061892 (from which this application claims priority) dated Jul. 15, 2016 and English-language translation thereof.

\* cited by examiner

*Primary Examiner* — Robert S Loewe
(74) *Attorney, Agent, or Firm* — Ewers & Hasselmann PLLC

(57) ABSTRACT

A process for producing an optical glass with an anti-fog coating is disclosed. The process includes the steps of: a) providing an optical glass, b) preparing a layer having Si—H groups (silane groups) on the optical glass, and c) reacting the silane groups with a compound having hydrophilic groups and at least one group reactive to the silane group.

19 Claims, No Drawings

PROCESS FOR PRODUCING AN OPTICAL GLASS WITH AN ANTI-FOG COATING

CROSS REFERENCE TO RELATED APPLICATIONS

This application is a continuation application of International Application No. PCT/EP2016/061892 filed on May 26, 2016, and claims priority to German patent application DE 10 2015 209 794.3 filed on May 28, 2015, both of which are hereby incorporated by reference in their entireties as if fully set forth herein.

TECHNICAL FIELD

The disclosure relates to a process for producing an optical glass with an anti-fog coating and to an optical glass with an anti-fog coating.

BACKGROUND

Optical glasses such as lenses, particularly spectacle glasses, contact lenses or other optical glasses for correcting refractive error, are known from the related art. They frequently have an anti-reflective coating, which is also called anti-reflective treatment. This often takes the form of a plurality of coatings of materials with different refractive indices arranged above one another, which have the desired overall anti-reflective effect.

Optical glasses are also known to be provided with a coating that is intended to reduce steaming up (anti-fog coating). Generally, such a coating should minimize the contact angle of water droplets settled on the surface such that the light scattering is reduced and results in at most low optical clouding or none at all. The provision of optical glasses is likewise known with coatings which combine overall anti-reflective and anti-fog properties.

SUMMARY

An object of the present disclosure is to create optical glasses and a process for producing optical glasses that have good and permanent anti-fog properties.

This object can be achieved by a process including:
a. providing an optical glass,
b. preparing a layer having Si—H groups on the optical glass, and
c. reacting the Si—H groups of the layer with a compound having hydrophilic groups and at least one group reactive to the Si—H groups.

According to an aspect of the disclosure, the anti-fog coating applied in step c. is attached by means of Si—C bonds (covalent) stable to hydrolysis with the Si atoms of the layer prepared in step b. These Si atoms are in turn bonded to the optical glass, preferably to an anti-reflective coating applied thereto.

According to another aspect of the disclosure, a layer having reactive Si—H groups (silane groups) is firstly prepared on the surface of the glass (preferably the anti-reflective coating applied thereto), and in the next step hydrophilic groups are reacted with these reactive Si—H groups.

DESCRIPTION OF EXEMPLARY EMBODIMENTS

Firstly, some terms used in the context of the disclosure are explained.

Optical glasses are elements with transmissive properties for optical purposes. These preferably take the form of glasses for ophthalmological purposes, such as spectacle glasses or contact lenses. The term glass in this case is understood in a functional sense and comprises, for example, both customary (inorganic) glasses such as, in particular, silicate glasses and transparent polymers and other plastic glasses. In this case, it can take the form of a known polymer used to produce spectacle glasses, including by way of example CR-39® (polyallyldiglycol carbonate (PDAC)), CR-607® and Trivex® (nitrogen-modified polyurethane) from PPG Industries and also the MR series (thiourethane polymers) from Mitsui Chemicals. Suitable polymers are familiar to those skilled in the art.

The glasses typically have an anti-reflective coating. This generally takes the form of one or more thin layers having an optical refractive index which differs from the index of the glass material. In the case of several layers, the indices also differ from one another. Details are familiar to those skilled in the art and do not require any more detailed explanation here. The present disclosure can also be applied in the case of silicate-containing hardened glasses without anti-reflective coatings. Critical for the success of the process according to the disclosure is that Si atoms are available on the surface to which the anti-fog coating described can bind in accordance with the process according to the disclosure.

In a preferred embodiment of the disclosure, the optical glasses comprise plastic glasses, preferably PDAC, polythiourethane or episulphide glasses, or mineral hardened glasses, preferably crown glasses or flint glasses, and an anti-reflective coating applied externally to the plastic glasses or mineral hardened glasses, wherein the anti-reflective coating comprises at least two discrete layers and the external layer of the anti-reflective coating comprises at least one silicon oxide, silicon hydroxide, and/or silicon oxide hydrate ($SiO_x$). The external coating or external layer is that coating or layer which is furthest distant from the surface of the plastic glass or mineral hardened glass, independently of whether the frontal side surface or the reverse side surface of the plastic glass or the mineral hardened glass is being considered. The layer thickness of the external silicon oxide, silicon hydroxide and/or silicon oxide hydrate layer in this embodiment is preferably in a range from 2 nm to 400 nm, more preferably in a range from 14 nm to 190 nm, particularly preferably in a range from 21 nm to 140 nm, and especially preferably in a range from 40 nm to 100 nm. The layer thickness of the external silicon oxide, silicon hydroxide, and/or silicon oxide hydrate layer is determined preferably via reflectometric thin layer measurement, preferably using the measuring device ZEISS MCS 600.

An anti-fog coating prevents steaming up in a humid, in particular a humid and (in comparison to the surface temperature of the glass) warm environment. Generally, a coating of this kind causes condensed water droplets to accumulate on the surface of a coated optical glass with a small contact angle and, in the ideal case, to form a transparent film of water. Such a coating has hydrophilic properties.

It is achieved by the process according to the disclosure that the anti-fog coating binds by means of Si—C bonds at the Si atoms, which in turn are bonded to the glass surface or to the anti-reflective coating.

The disclosure recognizes that the customary binding by means of silanol bonds (Si—O—C) in the prior art is disadvantageous because these bonds may hydrolyze under the customary application conditions of a spectacle glass, whereupon the groups producing the anti-fog effect are detached from the surface and thus the desired anti-fog effect is reduced or lost.

The disclosure enables active substances with an anti-fog effect to bind firmly with a high selectivity to the surface of the glass or the anti-reflective coating thereof, such that hydrolytic removal thereof is not possible. In particular, thin layers (preferably <100 nm, more preferably <30 nm) up to monomolecular layers can be applied.

In the context of the disclosure, the Si atoms are constituents of the glass surface (preferably of the anti-reflective coating) or are bonded thereto. Very frequently the outwardly facing layer is a multi-layer anti-reflective coating of silicate or comprises silicate such that Si atoms on this surface are available in principle for Si—C bonding. They may be made accessible for such bonding in a manner according to the disclosure described in more detail below. Alternatively or additionally, it is also possible in accordance with the disclosure to coat the surface of the glass or the anti-reflective coating with silanes, as is described in more detail below.

The anti-fog coating has hydrophilic groups. This causes water to settle on the surface with a smaller contact angle than single drops such that it results in only minor light scattering, if any at all, and produces only a slight, if any, clouding. It is preferable if the contact angle also remains below 10° in the longer term.

Optical glasses with anti-fog coating according to the disclosure particularly have a contact angle between water droplets and coated glass surface of ≤10°, typically the contact angle being in a range of 1° to 9°, more typically in a range of 0.5° to 7° and even more typically in a range of 0° to 5°. To determine the contact angle, a water droplet located on the surface of the coated optical glass is recorded photographically from the side and the angle which the water droplets forms with the coated surface of the optical glass is measured. The contact angle is preferably measured using KRÜSS MSA or KRÜSS DSA100 measuring instruments.

Suitable hydrophilic groups are known to those skilled in the art and are extensively described in the prior art, reference being made here to U.S. Pat. No. 9,500,860, for example. This document is incorporated by way of reference thereto also to the subject matter of the present disclosure.

U.S. Pat. No. 9,500,860 discloses a halosilane or alkoxysilane already provided with hydrophilic groups which can be reacted with a reactive surface group of glass with formation of Si—O bonds. In contrast to the present disclosure therefore, an anti-fog coating is applied in a single reaction step. Anti-fog coatings prepared according to this process of the prior art are significantly more sensitive to hydrolysis.

Suitable hydrophilic groups of the anti-fog coating according to the disclosure include preferably polyoxyalkylene groups, preferably polyoxyethylene and/or polyoxypropylene groups. The polyoxyalkylene chain length is preferably 2 to 10, more preferably 2 to 6, even more preferably 3 to 5 or 4 to 5 oxyalkylene units. The preferred chain length of the individual alkylene units is 2 to 4 carbon atoms (oxyethylene, oxypropylene or oxybutylene units). It is further preferable that the polyoxyalkylene groups have at least two groups reactive to silane groups. They can be doubly or multiply attached to the surface in the manner of a so-called loop formation such that the stability particularly to hydrolysis is further increased.

The preparation of a layer with Si—H groups can be effected such that Si atoms already present on the surface as constituent of the anti-reflective coating are modified, in general reduced, such that they bear reactive Si—H bonds. Alternatively, it is possible to apply additional Si atoms to the surface of the anti-reflective coating under such conditions that the desired reactive Si—H groups are formed.

According to a first variant of the process according to the disclosure, a halosilane, preferably a halosilane having 2 or 3 halogen atoms, more preferably chlorosilane, is applied in step b. The application can be effected by techniques familiar to those skilled in the art, such as chemical vapor deposition (CVD) or else in solution. The halosilanes react with hydroxyl groups (silanol groups) of the anti-reflective coating with formation of siloxane bonds.

Halosilanes which may be used are, for example, trichlorosilane, dichlorosilane, chlorosilane, dichloromethylsilane, chlorodimethylsilane, chloro(methyl)phenylsilane, chlorophenylsilane, dichlorophenylsilane, ethyldichlorosilane, diisobutylchlorosilane, isobutyldichlorosilane and/or dichloroethylsilane.

Typically, the halosilanes used are chlorophenylsilane, dichloroethylsilane, trichlorosilane, dichlorosilane and/or chlorosilane.

In step b. of the process according to the disclosure, an optionally coated optical glass is placed in a solution comprising at least one halosilane, wherein the solution comprises the at least one halosilane in a proportion in a range of 0.1 to 1.0% by weight, typically in a range of 0.2 to 0.8% by weight, more typically in a range of 0.3 to 0.6% by weight, based in each case on the total weight of the solution. The solvent used in this case is with particularity an aprotic non-polar solvent, typically toluene or xylene.

The above-mentioned amounts also then apply if two or more halosilanes different from one another are used.

According to a further variant of the process according to the disclosure, step b. is effected by applying $SiO_x$ under reducing conditions in the presence of hydrogen.

According to yet another variant of the disclosure, it is possible that step b. is effected by reduction of Si—O groups on the surface of the anti-reflective coating with radical hydrogen. This can be conducted in particular in a plasma, for example, an RF plasma in the presence of hydrogen. Typically, a low-pressure plasma is used with pure hydrogen. The plasma is generated in a Tetra 100 from Diener electronic.

The anti-fog layer can be bonded to the reactive Si—H groups in accordance with the disclosure, typically by hydrosilylation. The hydrosilylation refers to the addition of a silane to a double bond in the presence of a catalyst, generally a platinum catalyst. Details of the reaction are familiar to those skilled in the art and do not require any more detailed explanation here.

The platinum catalyst used may be, for example, platinum (0)-1,3-divinyl-1,1,3,3-tetramethyldisiloxane (CAS [68478-92-2]), cis-bis(benzonitrile)dichloroplatinum(II) (CAS [15617-19-3]), platinum(0), platinum(0) on an aluminium oxide, silicon oxide or activated carbon support, platinum (II) chloride (CAS [10025-65-7]), platinum(IV) chloride (CAS [13454-96-1]), hexachloroplatinic acid (CAS [16941-12-1]), a complex of platinum chloride and alcohols, aldehydes or ketones, a platinum olefin complex such as $Pt(CH_2=CH_2)_2(PPh_3)_2$ or $Pt(CH_2=CH_2)_2Cl_2$, a platinum phosphine complex such as $Pt(PPh_3)_4$ or $Pt(PBu_3)_4$ and/or a platinum phosphite complex such as $Pt[P(OPh)_3]_4$ or $Pt[P(OBu)_3]_4$.

The platinum catalyst used is typically platinum(0)-1,3-divinyl-1,1,3,3-tetramethyldisiloxane (CAS [68478-92-2]) or hexachloroplatinic acid (CAS [16941-12-1]).

With particularity the compound used in step c. has at least one reactive C=C double bond, typically at least one vinyl group. More typically, the compound used in step c. is a vinyl polyoxyalkylene compound.

In a particular embodiment, a compound of the formula $RR^1C=CR^2-A_x-[O-C_nH_m]_y-R^3$ (I) is used in step c., where R=H, linear $C_1$-$C_{10}$-alkyl or branched $C_1$-$C_{10}$-alkyl, typically R=H or Me, more typically R=H;

$R^1$=H, linear $C_1$-$C_{10}$-alkyl or branched $C_1$-$C_{10}$-alkyl, typically $R^1$=H or Me, more typically $R^1$=H;

$R^2$=H or Me, typically $R^2$=H;

A=linear $C_1$-$C_{10}$-alkyl or branched $C_1$-$C_{10}$-alkyl, in each case optionally functionalized with OH, $NH_2$ or $SO_2$, typically linear $C_1$-$C_4$-alkyl, more typically $CH_2$;

x=0 or 1;

$C_nH_m$=linear or branched, in each case optionally functionalized with OH or $NH_2$, typically linear and non-functionalized;

n=1 to 10;

m=2n;

y=0 to 20, typically 1 to 15, more typically 3 to 11; and $R^3=A_x-CR^2=CRR^1$, $SO_3Na$, H or OH, typically $A_x-CR^2=CRR^1$.

The compound used in step c. may be, for example, poly(ethylene glycol) divinyl ether (CAS [50856-26-3]), diethylene glycol divinyl ether (CAS [764-99-8]), di(ethylene glycol) vinyl ether (CAS [929-37-3]), triethylene glycol divinyl ether (CAS [765-12-8]), allyl ether (CAS [557-40-4]), hydroxybutyl vinyl ether (CAS [17832-28-9]), allyl alcohol (CAS [107-18-6]), allyloxyethanol (CAS [111-45-5]), 3-allyloxy-2-hydroxy-1-propanesulphonic acid sodium salt (CAS [52556-42-0]) and/or 3-allyloxy-1,2-propanediol (CAS [123-34-2]). In step c., preference is given to using poly(ethylene glycol) divinyl ether (CAS [50856-26-3]), diethylene glycol divinyl ether (CAS [764-99-8]), di(ethylene glycol) vinyl ether (CAS [929-37-3]) and/or triethylene glycol divinyl ether (CAS [765-12-8]).

The optical glasses obtained in step b. are introduced to the hydrosilylation provided in step c., typically in a solution comprising the compound (I), wherein the proportion of compound (I) is in a range of 0.4 to 1.8% by weight, typically in a range of 0.5 to 1.4% by weight, more typically in a range of 0.6 to 1.2% by weight, based in each case on the total weight of the solution. The solvent used is an aprotic non-polar solvent, typically toluene or xylene.

In accordance with the disclosure, polyoxyalkylene groups may thus be anchored to the surface of the anti-reflective coating permanently and in a manner stable to hydrolysis by means of Si—C bonds.

The present disclosure further relates to an optical glass with an anti-fog coating, obtainable by a process according to the disclosure. The optical glass according to the disclosure is characterized by high resistance and durability of the anti-fog coating due to the bonding by means of Si—C bonds stable to hydrolysis.

In a typical embodiment of the disclosure, the optical glasses, particularly spectacle glasses, having an anti-fog coating comprise plastic glasses that are transparent in the visible spectral region, preferably PDAC, polythiourethane or episulphide glasses, and a coating applied to the plastic glasses, wherein the coating, proceeding from the respective frontal side or the reverse side of a plastic glass, comprises at least a) a hard lacquer layer, preferably comprising a sol-gel hard lacquer composition based on an aryl polymer, an epoxy polymer, a urethane polymer, a melamine polymer and/or based on an inorganic material, typically siloxane, b) an anti-reflective layer comprising at least three discrete layers, in each case composed of or with at least one metal oxide, metal hydroxide and/or metal oxide hydrate of Al, Si, Ti, Zr, Ce, Sn, In, Cr and/or mixtures thereof, wherein the layer of the anti-reflective layer furthest away from the frontal side or reverse side of the plastic glass comprises silicon oxide, silicon hydroxide and/or silicon oxide hydrate, and c) an anti-fog layer, wherein the anti-fog layer is obtainable by covalent bonding of a halosilane, typically chlorosilane, to the anti-reflective layer of b) and subsequently reacting with a compound of the formula (I).

In a further embodiment of the disclosure, the optical glasses, particularly spectacle glasses, having an anti-fog coating comprise plastic glasses that are transparent in the visible spectral region, preferably PDAC glasses, and a coating applied to the plastic glasses, wherein the coating, proceeding from the respective frontal side or the reverse side of the plastic glasses, comprises at least a) one layer according to Claim 1 of EP 2 578 649 A1, b) an anti-reflective layer, which comprises at least three discrete layers, wherein these layers each have a refractive index different from one another, wherein the layers with high refractive index (n≥1.6, in particular at a wavelength of 550 nm) and low refractive index (n<1.6, in particular at a wavelength of 550 nm) are typically arranged alternately and the layer within the anti-reflective layer furthest from the frontal side or reverse side of the plastic glass comprises at least one silicon oxide, silicon hydroxide and/or silicon oxide hydrate, and c) an anti-fog layer wherein the anti-fog layer is obtainable by treating the plastic glasses coated with an anti-reflective layer b) in a low-pressure plasma with pure hydrogen and subsequently reacting with a compound of the formula (I) in the presence of a platinum catalyst.

In a typical embodiment of the disclosure, the optical glasses, particularly spectacle glasses, having an anti-fog coating comprise plastic glasses that are transparent in the visible spectral region, preferably PDAC, polythiourethane or episulphide glasses, or mineral hardened glasses, preferably crown glasses or flint glasses, and at least one coating applied to the optical glasses, wherein the coating, proceeding from the respective frontal side or the reverse side of the plastic glass or mineral hardened glass, comprises a) an anti-reflective layer comprising alternating discrete metal oxide, metal hydroxide and/or metal oxide hydrate layers of the elements Al, Si and/or Ti, wherein at least one silicon oxide, silicon hydroxide and/or silicon oxide hydrate layer is furthest from the frontal side or reverse side of the optical glass, and b) an anti-fog layer, wherein the anti-fog layer is obtainable by covalent bonding of a chlorosilane, preferably trichlorosilane, dichlorosilane, chlorosilane, dichloromethylsilane, chlorodimethylsilane, chloro(methyl)phenylsilane, chlorophenylsilane, dichlorophenylsilane, ethyldichlorosilane, diisobutylchlorosilane, isobutyldichlorosilane and/or dichloroethylsilane, to the anti-reflective layer of a) and subsequently reacting with a compound of the formula (I) in the presence of a platinum or rhodium catalyst, typically platinum catalyst.

In a further typical embodiment, the optical glasses, particularly spectacle glasses, having an anti-fog coating comprise plastic glasses, preferably PDAC or polythiourethane glasses, and at least one coating applied to the plastic glasses, wherein the coating, proceeding from the respective frontal side or the reverse side of the plastic glasses, comprises at least
- a) one anti-reflective layer with an overall layer thickness in a range of 97 nm to 2000 nm, typically in a range of 112 nm to 1600 nm, more typically in a range of 121 nm to 1110 nm, even more typically in a range of 132 nm to 760 nm and even more typically in a range of 139 nm to 496 nm, wherein the anti-reflective layer comprises at least one silicon oxide, silicon hydroxide and/or silicon oxide hydrate, and
- b) an anti-fog layer,
  wherein the anti-fog layer is obtainable by covalent bonding of at least one halosilane to the silicon oxide, silicon hydroxide and/or silicon oxide hydrate layer of the anti-reflective layer of a) or by treating plastic glasses coated with an anti-reflective layer a) in a low-pressure plasma with pure hydrogen and in each case subsequently reacting with at least one compound of the formula (I), where preferably $R=R^1=R^2=H$, $A=CH_2$, $x=0$ or 1, $C_nH_m$=linear alkyl where n=1 to 4, m=2n, y=1 to 7, and $R^3=A_x-CR^2=CRR^1$ or OH.

In a further embodiment, the optical glass having an anti-fog coating comprises a plastic glass or a mineral hardened glass and at least one coating applied to the optical glass, wherein the coating, proceeding from the frontal side or the rear side of the plastic glass or mineral hardened glass
- a) optionally comprises a hard lacquer layer,
- b) comprises an anti-reflective layer, wherein the anti-reflective layer comprises at least two discrete layers, and at least one of the layers comprises a silicon oxide, silicon hydroxide and/or silicon oxide hydrate layer, and
- c) comprises an anti-fog layer,
  wherein the anti-fog layer is obtainable by covalent binding of a halosilane to the silicon oxide, silicon hydroxide and/or silicon oxide hydrate layer of the anti-reflective layer of b) or by treating the plastic glasses or mineral hardened glasses coated with an anti-reflective layer b) in a low-pressure plasma with pure hydrogen and in each case subsequently reacting with a compound of the formula (I) $RR^1-C=CR^2-A_x-[O-C_nH_m]_y-R^3$, where
  $R=H$, linear $C_1$-$C_{10}$-alkyl or branched $C_1$-$C_{10}$-alkyl;
  $R^1=H$, linear $C_1$-$C_{10}$-alkyl or branched $C_1$-$C_{10}$-alkyl;
  $R^2=H$ or Me;
  $A$=linear $C_1$-$C_{10}$-alkyl or branched $C_1$-$C_{10}$-alkyl, in each case optionally functionalized with OH, $NH_2$ or $SO_2$;
  $x=0$ or 1;
  $C_nH_m$=linear or branched, in each case optionally functionalized with OH or $NH_2$;
  n=1 to 10;
  m=2n;
  y=0 to 20; and
  $R^3=A_x-CR^2=CRR^1$, $SO_3Na$, H or OH.

It is self-evident to those skilled in the art that the process according to the disclosure for producing optical glasses with anti-fog coating may be used both for optical glasses with or without individual correction, e.g., of the eyesight, and for optical glasses with further functionality, e.g., tinted optical glasses, polarized optical glasses or photochromic optical glasses.

Two working examples of the process according to the disclosure are illustrated below.

Example 1

A glass with commercial LotuTec anti-reflective coating from ZEISS without Clean Coat finish is coated with pure dichloroethylsilane (CAS [1789-58-8]) in a nitrogen atmosphere at room temperature and dried. The top coating is washed off with toluene (anhyd.) before carrying out the next process step.

The glass is then dipped in a solution of 1.0 g of divinyl polyethylene glycol ether (Mn~230 g/mol; CAS [50856-26-3]) and 0.1 ml of catalyst (platinum(0)-1,3-divinyl-1,1,3,3-tetramethyldisiloxane (CAS [68478-92-2]) in xylene) in 100 mL of dry toluene for 30 min at 60° C. The coated glass is washed with demineralized water and dried.

Example 2

A glass with commercial LotuTec anti-reflective coating from ZEISS without Clean Coat finishing is activated with a low-pressure plasma at 500 W for 180 s.

The glass is then coated with dichloroethylsilane (CAS: 1789-58-8) in a nitrogen gas atmosphere at room temperature and dried. The top coating is washed off with toluene (anhyd.) before carrying out the next process step.

The glass is then dipped in a solution of 1.0 g of divinyl polyethylene glycol ether (Mn~230 g/mol; CAS [50856-26-3]) and 0.1 mL of catalyst (platinum(0)-1,3-divinyl-1,1,3,3-tetramethyldisiloxane (CAS [68478-92-2]) in xylene) in 100 mL of dry toluene for 30 min at 60° C. The coated glass is washed with demineralized water and dried.

Characterization of the Anti-Fog Coating According to the Disclosure

For a visual assessment, the optical glasses coated with an anti-fog coating according to the disclosure were held for 10 seconds at a distance of 10 cm over a warm water bath at 90° C. and then laid on paper preferably with written text. The more readable the text, the better the visual assessment of the optical glasses.

In comparison to the optical glasses used as starting material in Examples 1 and 2, the optical glasses of Examples 1 and 2 coated with anti-fog coating according to the disclosure were significantly less steamed up and therefore enabled significantly better readability of an underlying text.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A process for producing an optical glass with an anti-fog coating, the process comprising:
    a. providing an optical glass, wherein the optical glass is selected from the group consisting of lenses, spectacle glasses, contact lenses and other optical glasses for correcting refractive error,
    b. preparing a layer having Si—H groups on the optical glass, and
    c. reacting the Si—H groups of the layer with a compound having hydrophilic groups and at least one group reactive to the Si—H groups.

2. The process according to claim 1, wherein step b. is effected by applying a halosilane.

3. The process according to claim 1, wherein step b. is effected by applying $SiO_x$ under reducing conditions in the presence of hydrogen.

4. The process according to claim 1, wherein step b. is effected by reducing Si—O groups on the surface of the optical glass with radical hydrogen.

5. The process according to claim 4, wherein the reduction takes place in a plasma with hydrogen gas.

6. The process according to claim 1, wherein in step c. a hydrosilylation is carried out.

7. The process according to claim 6, wherein the compound used in step c. has at least one reactive C=C double bond.

8. The process according to claim 7, wherein the compound used in step c. is a vinyl polyoxyalkylene compound.

9. The process according to claim 7, wherein the compound used in step c. has a vinyl group.

10. The process according to claim 1, wherein the optical glass has an anti-reflective coating.

11. The process according to claim 10, wherein the anti-reflective coating contains $SiO_x$.

12. The process according to claim 1, wherein the optical glass is $SiO_x$-containing on the surface.

13. The process according to claim 1, wherein the hydrophilic groups comprise polyoxyalkylene groups.

14. The process according to claim 13, wherein the hydrophilic groups comprise polyoxyalkylene groups having a polyoxyalkylene chain length of 2 to 10.

15. The process according to claim 14, wherein the hydrophilic groups comprise polyoxyalkylene groups having a polyoxyalkylene chain length of 2 to 6.

16. The process according to claim 14, wherein the hydrophilic groups comprise polyoxyalkylene groups having a polyoxyalkylene chain length of 3 to 5.

17. The process according to claim 13, wherein the hydrophilic groups comprise polyethylene oxide groups, polypropylene oxide groups, or polyethylene oxide groups and polypropylene oxide groups.

18. An optical glass with an anti-fog coating, obtained by a process according to claim 1.

19. An optical glass with an anti-fog coating, wherein the optical glass comprises:
    a plastic glass or a mineral hardened glass, and
    at least one coating applied to the optical glass, wherein the at least one coating, proceeding from the frontal side or the rear side of the plastic glass or mineral hardened glass includes:
    a) optionally, a hard lacquer layer,
    b) an anti-reflective layer, wherein the anti-reflective layer comprises at least two discrete layers, and at least one of the layers includes at least one of a silicon oxide, silicon hydroxide, and silicon oxide hydrate layer, and
    c) an anti-fog layer on the anti-reflective layer,
    wherein the anti-fog layer is obtained by covalent binding of a halosilane to the silicon oxide, silicon hydroxide, and/or silicon oxide hydrate layer of the anti-reflective layer of b) or by treating the plastic glasses or mineral hardened glasses coated with an anti-reflective layer b) in a low-pressure plasma with pure hydrogen and in each case subsequently reacting with a compound of the formula (I) $RR^1C=CR^2-A_x-[O-C_nH_m]_y-R^3$, where $R$=H, linear $C_1$-$C_{10}$-alkyl or branched $C_1$-$C_{10}$-alkyl;
    $R^1$=H, linear $C_1$-$C_{10}$-alkyl or branched $C_1$-$C_{10}$-alkyl;
    $R^2$=H or Me;
    A=linear $C_1$-$C_{10}$-alkyl or branched $C_1$-$C_{10}$-alkyl, in each case optionally functionalized with OH, $NH_2$ or $SO_2$;
    x=0 or 1;
    $C_nH_m$=linear or branched, in each case optionally functionalized with OH or $NH_2$;
    n=1 to 10;
    m=2n;
    y=0 to 20; and
    $R^3=A_x-CR^2=CRR^1$, $SO_3Na$, H or OH.

* * * * *